US008638811B2

(12) United States Patent
Rajamani et al.

(10) Patent No.: US 8,638,811 B2
(45) Date of Patent: Jan. 28, 2014

(54) RECONFIGURABLE MULTIPLE-INPUT MULTIPLE-OUTPUT SYSTEMS AND METHODS

(75) Inventors: Krishnan Rajamani, San Diego, CA (US); Samir S. Soliman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1447 days.

(21) Appl. No.: 12/050,074

(22) Filed: Mar. 17, 2008

(65) Prior Publication Data
US 2009/0232061 A1    Sep. 17, 2009

(51) Int. Cl.
*H04J 3/16*    (2006.01)

(52) U.S. Cl.
USPC .......................................... 370/465; 370/329

(58) Field of Classification Search
USPC ......... 370/328–329, 331–334, 339, 432, 437, 370/465–466, 468
See application file for complete search history.

(56) References Cited

U.S. PATENT DOCUMENTS

| | | | |
|---|---|---|---|
| 7,260,659 B2 | 8/2007 | Chen et al. | |
| 7,545,891 B1* | 6/2009 | Pare et al. | 375/344 |
| 2002/0193146 A1 | 12/2002 | Wallace et al. | |
| 2004/0102193 A1 | 5/2004 | Kitami et al. | |
| 2005/0047384 A1* | 3/2005 | Wax et al. | 370/338 |
| 2005/0237971 A1* | 10/2005 | Skraparlis | 370/329 |
| 2006/0034217 A1* | 2/2006 | Kwon et al. | 370/328 |
| 2006/0234729 A1 | 10/2006 | Murakami et al. | |
| 2007/0105503 A1* | 5/2007 | Kim | 455/70 |
| 2007/0274253 A1* | 11/2007 | Zhang et al. | 370/328 |
| 2008/0013504 A1* | 1/2008 | Nishibayashi et al. | 370/338 |
| 2008/0075033 A1* | 3/2008 | Shattil | 370/328 |
| 2008/0095102 A1* | 4/2008 | Meng et al. | 370/329 |
| 2008/0170545 A1* | 7/2008 | Kim et al. | 370/329 |
| 2008/0232307 A1* | 9/2008 | Pi et al. | 370/328 |
| 2008/0293368 A1* | 11/2008 | Desai et al. | 455/138 |
| 2009/0059844 A1* | 3/2009 | Ko et al. | 370/328 |

(Continued)

FOREIGN PATENT DOCUMENTS

| | | |
|---|---|---|
| CN | 101132601 A | 2/2008 |
| JP | 2004179761 A | 6/2004 |
| JP | 2005039807 A | 2/2005 |
| JP | 2005516427 A | 6/2005 |
| KR | 1020040007661 | 1/2004 |
| WO | WO02099995 | 12/2002 |
| WO | WO2006045079 A1 | 4/2006 |
| WO | WO2006045097 | 4/2006 |

OTHER PUBLICATIONS

International Search Report & Written Opinion—PCT/US2009/035200, International Search Authority—European Patent Office—Sep. 15, 2009.

*Primary Examiner* — Kevin Mew
(74) *Attorney, Agent, or Firm* — Jeffrey D. Jacobs; Jonathan Velasco

(57) ABSTRACT

An exemplary wireless commutation device and method are disclosed for configuring a plurality of radio resources including a first radio resource and second radio resource in the wireless communication device. According to one aspect, the first and second radio resources are configured for spatial multiplexing according to a first communication system type. Upon receiving a request for communication over a second communication system type, at least one of the first and second radio resources are re-configured for communication over the second communication system type. According to another aspect, a first communication link over the first communication system is maintained while establishing a second communication link over the second communication system. According to another aspect, the other of the first and second radio resources for non-spatial multiplexing are re-configured according to the first communication system type.

36 Claims, 4 Drawing Sheets

(56) References Cited

U.S. PATENT DOCUMENTS

| | | | |
|---|---|---|---|
| 2009/0141691 A1* | 6/2009 | Jain | 370/338 |
| 2009/0326933 A1* | 12/2009 | Lin et al. | 704/223 |
| 2010/0097997 A1* | 4/2010 | Sandhu | 370/328 |
| 2010/0097999 A1* | 4/2010 | Trainin et al. | 370/328 |
| 2011/0122825 A1* | 5/2011 | Lee et al. | 370/328 |
| 2011/0170489 A1* | 7/2011 | Han et al. | 370/328 |
| 2011/0317679 A1* | 12/2011 | Jain | 370/338 |
| 2012/0207055 A1* | 8/2012 | Kang et al. | 370/252 |
| 2012/0263100 A1* | 10/2012 | Yuan et al. | 370/315 |
| 2012/0320826 A1* | 12/2012 | Kim et al. | 370/328 |

* cited by examiner

RECONFIGURABLE MULTIPLE-INPUT MULTIPLE-OUTPUT SYSTEMS AND METHODS

TECHNICAL FIELD

The present invention relates generally to wireless communication devices, and more specifically to multiple-input multiple-output wireless communication systems and methods.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Other examples of wireless network systems include one or more of the wireless standards published by the Institute of Electrical and Electronics Engineers (IEEE), such as 802.11 for Wireless local area networks (Wireless LAN or WLAN).

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

With the emergence of multiple wireless communication technologies in wider deployment, the need for establishing connections to more than one wireless communication system simultaneously may often arise. For example, a device such as a laptop computer, personal digital assistant (PDA), or mobile phone, may need to establish a first wireless connection to a first device, such as a wireless access point, to obtain data services to the Internet, and may also need to establish a second wireless connection to a second device, such as a mobile storage device for data storage. Existing efforts for providing multiple wireless connections typically involve either adding dedicated hardware and software modules to support each wireless network type, which undesirably consumes significant device area and is expensive, or otherwise employing complex software changes and or hardware changes for time sharing a single hardware module between the multiple network types simultaneously. The latter attempt often suffers from performance degradation, such as the inability to provide certain services, for example, due to the nature of time sharing a single hardware module.

Accordingly, there remains a strong need in the art for efficiently supporting simultaneously multiple wireless communication systems.

SUMMARY

A wireless commutation device and method are disclosed for configuring a plurality of radio resources in the wireless communication device. For example, the plurality of radio resources may include a first radio resource and second radio resource. For example, the first communication system type may be a wireless local area network or a wireless wide area network, and the second communication system type may be a wireless personal area network. According to another example, the first communication system type may be a first access point or base station controlling access to the first communication system, and the second communication system type may be an ad-hoc network.

According to one aspect, the first and second radio resources are configured for spatial multiplexing according to a first communication system type. Upon receiving a request for communication over a second communication system type, at least one of the first and second radio resources are re-configured for communication over the second communication system type. According to another aspect, a first communication link over the first communication system is maintained while establishing a second communication link over the second communication system. According to another aspect, the other of the first and second radio resources for non-spatial multiplexing are re-configured according to the first communication system type.

According to another aspect, a third radio resource and the other of the first and second radio resources are re-configured for spatial multiplexing according to the first communication system type.

According to another aspect, a communication link over the second communication system type is terminated, and the first and second radio resources for spatial multiplexing are re-configured according to the first communication system type.

The word "exemplary" is used herein to mean "serving as an example, instance, or illustration." Any embodiment described herein as "exemplary" is not necessarily to be construed as preferred or advantageous over other embodiments.

DETAILED DESCRIPTION

In wireless communication systems, a communication link may be established via a single-in-single-out (SISO), multiple-in-single-out (MISO), single-in-multiple-out (SIMO) or a multiple-input multiple-output (MIMO) system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. Under certain conditions, such as the channel environment, the MIMO system can provide improved performance (e.g., higher throughput and/or greater reliability) if the additional dimensionalities created by the multiple transmit and receive antennas are utilized.

Existing MIMO client devices employ a plurality of radio resources (e.g., radio front end hardware and software) which are dedicated for spatial multiplexing when configured for MIMO operation, such as connection to a MIMO access point. When not configured for MIMO operation, such as when connected to a non-MIMO access point (AP), existing MIMO client devices utilize a subset of the MIMO radio resources, typically only one of the available radio resources, while the remaining MIMO radio resources remain idle until MIMO operation is suitable. In other existing solutions, a receive diversity mode of operation may be employed where MIMO operation is not suitable.

Figure 1:
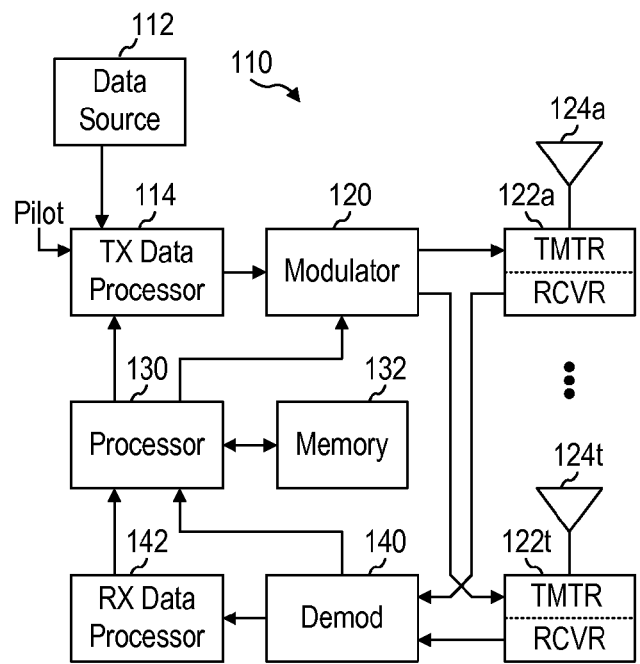
FIG. 1 is a block diagram depicting an exemplary wireless communication device capable of being configured and re-configured in accordance with one embodiment.

Referring to FIG. 1, there is shown a simplified block diagram of an exemplary wireless communication device 110 according to one embodiment. Wireless communication device 110 is depicted as a mobile access terminal, which may be, for example, a mobile phone, a PDA, laptop computer, among others. In certain embodiments, wireless communication device 110 may also be a fixed device, such as an access point or base station, for example. An access point may be a fixed station used for communicating with the mobile access terminals and may also be referred to as an access point, base station, a Node B, or some other terminology. Wireless communication device 110 may also be called an access terminal, user equipment (UE), a wireless communication device, terminal, access terminal or some other terminology.

Device 110 includes a transmit (TX) data processor 114 for receiving data source 112 for transmission of one or more data or information streams. TX data processor 114 formats, codes, and interleaves the traffic data for each data stream based on a particular coding scheme selected for that data stream to provide coded data. In certain embodiments, the coded data for each data stream may be multiplexed with pilot data. The pilot data is typically a known data pattern that is processed in a known manner and may be used at the receiver system to estimate the channel response. The multiplexed pilot and coded data for each data stream is then modulated (i.e., symbol mapped) by modulator 120 based on a particular modulation scheme (e.g., BPSK, QSPK, M-PSK, or M-QAM) selected for that data stream to provide modulation symbols. The data rate, coding, and modulation for each data stream may be determined by instructions performed by processor 130. In other embodiments, pilot data is not multiplexed with data by TX data processor 114.

As described in further detail below, device 110 may be configured or re-configured for spatial multiplexing, e.g., MIMO, operation, where each data stream is transmitted over a respective antenna, 124a through 124t. In this configuration mode, the modulation symbols for the data streams and/or modulation symbols may be further processed or pre-processed for spatial multiplexing. TX MIMO processor 120 then provides $N_T$ modulation symbol streams to $N_T$ transmitters (TMTR) 122a through 122t. In certain embodiments, TX MIMO processor 120 applies beamforming weights to the symbols of the data streams and to the antenna from which the symbol is being transmitted.

Each transmitter 122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 122a through 122t are then transmitted from $N_T$ antennas 124a through 124t, respectively, for reception by a receiver (not shown).

Also described in further detail below, device 110 may be configured or re-configured for independent client station operation over at least one of antennas 124a through 124t. In this configuration, at least one of the radio resources, i.e., transmit and/or receive chains and their associated processing blocks, suitable for spatial multiplexing configuration is configured or re-configured for independent single-input single-output (SISO) operation (or if radio resources permit, MIMO operation with fewer radio resources). The remaining radio resources may be configured or re-configured for either SISO, or if radio resources permit, MIMO operation with fewer radio resources.

Device 110 also receives signals via antennas 124a through 124t in accordance with its configuration, e.g., MIMO or multiple SISO/MIMO operation. Transmitted modulated signals are received by antennas 124a through 124t and the received signal from each antenna is provided to a respective receiver (RCVR) 122a through 122t. Each receiver conditions (e.g., filters, amplifies, and downconverts) a respective received signal, digitizes the conditioned signal to provide samples, and further processes the samples to provide a corresponding "received" symbol stream.

Demodulator 140 then receives and processes the received symbol streams from receivers 122a through 122t based on a particular receiver processing technique to provide "detected" symbol streams. Demodulator 140 (with the help of RX Data Processor 142) then demodulates, deinterleaves, and decodes each detected symbol stream to recover the traffic data for the data stream. As with the transmit radio resources, the receive radio resources may be configured for spatial multiplexing operation, and further be configured or re-configured to operate at least one of the MIMO radio resources for independent SISO operation.

Figure 2:
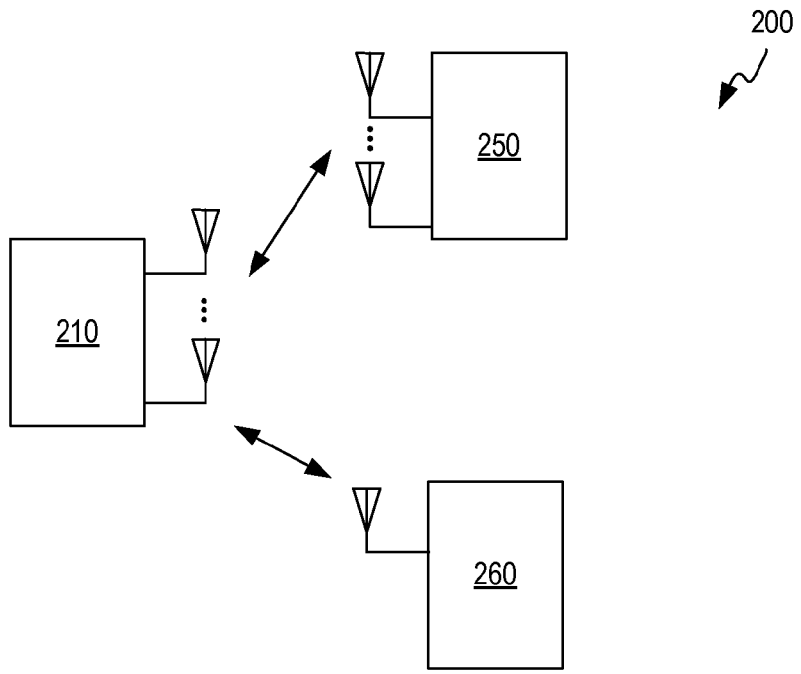
FIG. 2 is a block diagram depicting a system arrangement capable of supporting a wireless communication device in accordance with one embodiment.

Referring next to FIG. 2, there is shown system 200 including wireless communication device 210, which corresponds to device 110 of FIG. 1 in one embodiment. As described above, device 210 includes a plurality of radio resources which may be configured for MIMO operation, where at least one of the radio resources may be configured or re-configured for SISO operation. System 200 further includes a second wireless communication device 250 including a plurality of radio resources suitable for configuration for MIMO operation or SISO operation. System 200 also includes a third wireless communication device 260 having a radio resource suitable for SISO operation. In one embodiment, device 210 and device 250 communicate according to a first communication system type, such as a wireless local area network (WLAN), for example, where device 250 may be a WLAN access point, for example.

WLAN system is used for illustration purposes only. In other embodiments, the first communication type may be a wireless wide area network (WWAN) or other network suitable for MIMO operation.

In one embodiment, device 210 and device 260 communicate according to a second communication system type, such as a wireless personal area network (WPAN), for example, where device 260 may be a Bluetooth device with high speed channel, for example. The high speed channel in this case is implemented using 802.11. An exemplary operation of device 210 in system 200 will now be described in conjunction with the flowcharts of FIGS. 3 through 5.

Figure 3:
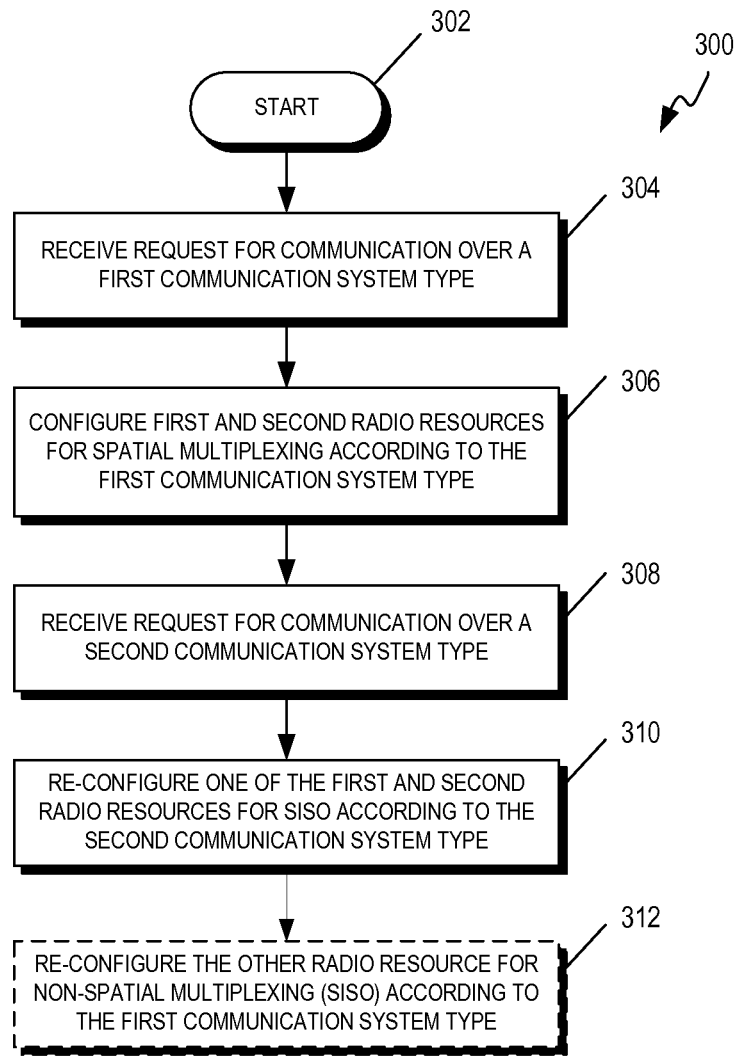
FIGS. 3 through 5 are flow charts depicting exemplary methods for configuring and re-configuring radio resources of a wireless communication device in accordance with various embodiments.

Flow chart 300 of FIG. 3 begins at block 302. At block 304, device 210 receives a request for communication over a first communication system type. For example, device 210 may receive a request to communicate with WLAN AP 250 according to a WLAN arrangement. As discussed above, both devices 210 and 250 may be configured for spatial multiplexing, employing MIMO operation, in the exemplary embodiment of FIG. 2.

Next at block 306, first and second radio resources for device 210 are configured for spatial multiplexing (MIMO) according the first communication system type, WLAN in the present example. Similarly first and second radio resources for device 250 are configured for spatial multiplexing. The details for configuring radio resources for spatial multiplexing according to one embodiment are described in further detail below in conjunction with FIG. 6.

Next at block 308, device 210 receives a request for communication over a second communication system type. For example, device 210 may receive a request to communicate with Bluetooth device 260 in high speed channel mode according to a WPAN arrangement. At block 310, device 210 re-configures one of the first and second radio resources for non-spatial multiplexing operation, i.e., SISO operation, in accordance with the second communication system type. The details for configuring radio resources for SISO operation according to one embodiment are described in further detail below in conjunction with FIG. 6.

The communication link configured in accordance with the first communication type may downgrade to SISO operation. As shown in FIG. 3, downgrade to SISO operation may be carried out in optional block 312 where device 210 re-configures the other radio resource for non-spatial multiplexing (SISO) operation according to the first communication type. For example, the WLAN communication between device 210 and 250 may be re-configured for SISO. Some embodiments of device 210 may choose to perform Step 312 before or in parallel with Step 310.

In accordance with the operations of flowchart 300, device 210 is able to establish an independent client station connection with device 260, while maintaining a simultaneous connection to device 250. In this way, device 210 is able to dynamically reconfigure its radio resources from a first radio configuration implemented as a single client station in MIMO mode having a plurality of synchronized symbol streams to a second radio configuration implemented as two or more independent client station configurations, each in SISO mode and having respective unsynchronized independent symbol streams.

Figure 4:
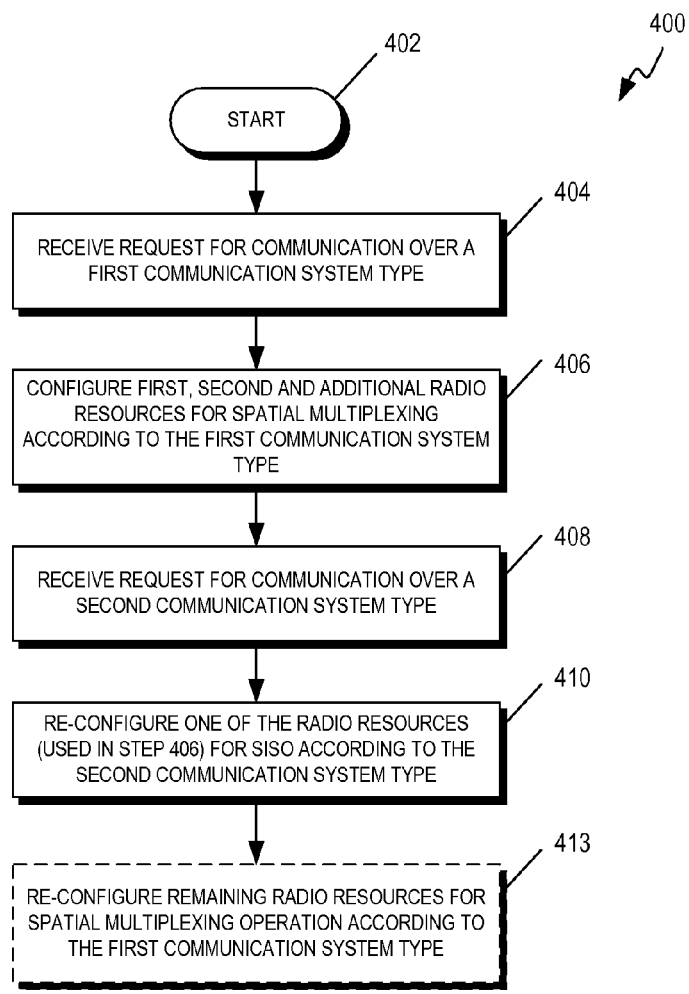

Flow chart 400 of FIG. 4 depicts the operation of device 210 according to another embodiment. Processing blocks 402 through 410 of flowchart 400 generally correspond to processing blocks 302 through 310, respectively, as discussed above in conjunction with FIG. 3. Additionally, in certain embodiments, device 210 and/or device 250 may include more than first and second radio resources, and in such case, those additional resources may also be configured in conjunction with first and second radio resources for spatial multiplexing (MIMO) operation at block 406.

Flowchart 400 also differs from flowchart 300 following processing block 410. At block 413, instead of re-configuring the communication link with device 250 for SISO, device 210 may have additional radio resources to maintain spatial multiplexing operation according to the first communication system type with device 250. For example, if at block 406, device 210 configured first, second, and third radio resources for spatial multiplexing operation with device 250, and at block 410 reconfigured the second radio resource for SISO operation with device 260, at block 413, device 20 may configure the third radio resource together with the first radio resource for MIMO operation with device 250.

In accordance with the operations of flowchart 400, device 210 is able to establish an independent client station connection with device 260, while maintaining a simultaneous connection to device 250. In this way, device 210 is able to dynamically reconfigure its radio resources from a first radio configuration implemented as a single client station in MIMO mode having a plurality of synchronized symbol streams to a second radio configuration implemented as two or more independent client station connections, one in SISO mode and the other in a lower-order MIMO mode. The symbol streams associated with the MIMO mode are synchronized streams with respect to each other, but are independent with respect to the streams associated with the SISO mode. In other embodiments of Flowchart 400, device 210 may choose to use SISO for the first connection and MIMO for the second connection; or use MIMO for both if sufficient radio resources are available.

Figure 5:
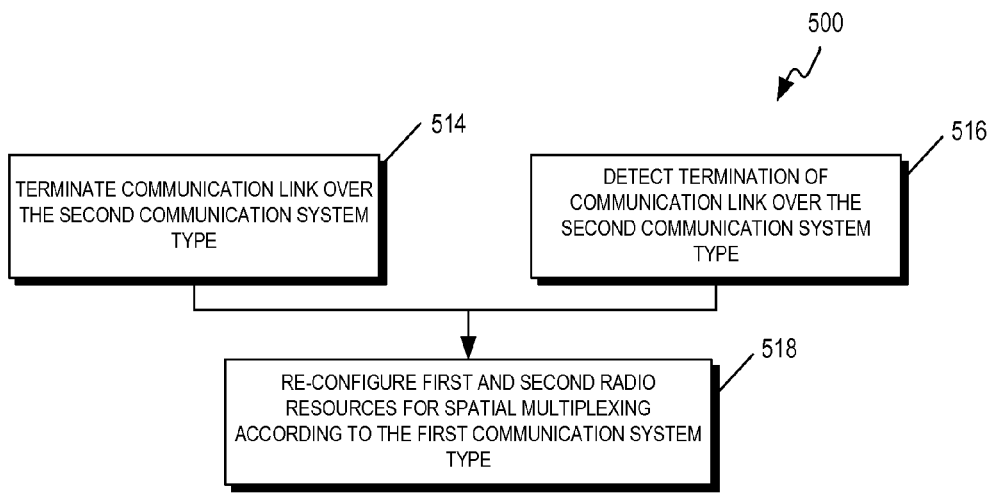

FIG. 5 is a flow chart 500 depicting the operations of device 210 following processing block 312 of FIG. 3 or 413 of FIG. 4 according to one embodiment. During the course of communication between device 210 and device 260, their communication link may be terminated, either voluntarily, e.g., by command, or involuntary, e.g., by interference, loss of signal, etc. At block 514, device 210 initiates the termination of the communication link over the second communication system type between device 210 and device 260. At block 516, device 210 detects the termination of the communication link over the second communication system type between device 210 and device 260.

Blocks 514 and 516 continue to block 518, where the first and second radio resources are re-configured for spatial multiplexing (MIMO) according to the first communication system type, WLAN in the example of FIG. 2. In the embodiment described above in conjunction with FIG. 4, the first communication system type was retained as MIMO having fewer radio resources. In this case, block 518 involves re-configuring all the available resources, e.g. first, second, and third radio resources, for spatial multiplexing (MIMO) according to the first communication system type.

Figure 6:
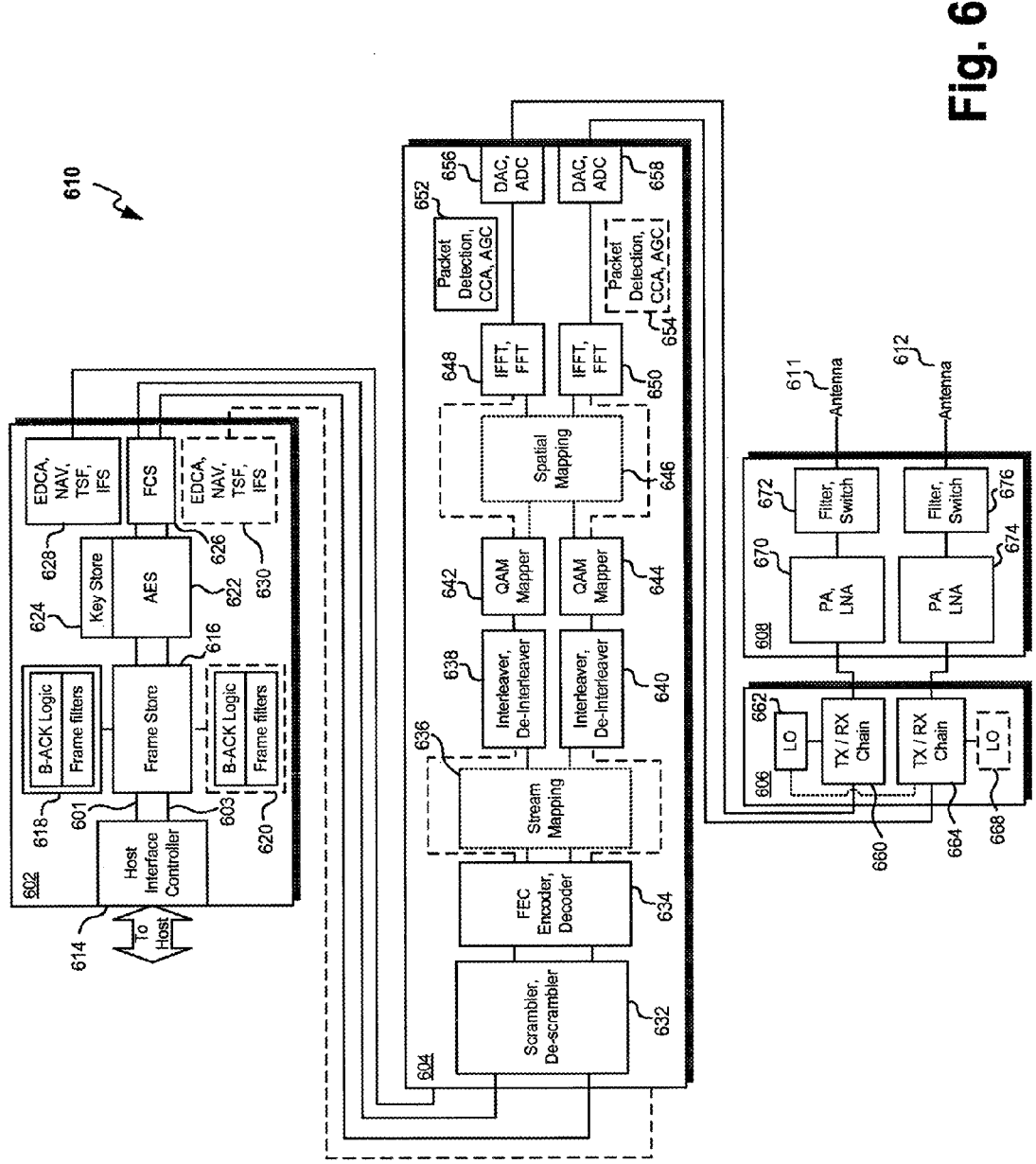
FIG. 6 is a block diagram depicting an exemplary wireless communication device capable of being configured and re-configured in accordance with one embodiment.

Referring now to FIG. 6, a block diagram depicting exemplary device 610 is described to illustrate the configuration and re-configuration operation of a wireless communication device as described above in conjunction with FIGS. 3 through 5, according to one embodiment. Device 610 may be one embodiment of device 210 of FIG. 2 suitable for communication over a 802.11 WLAN type network, including 802.11n, for example, and over a Bluetooth type network to establish high speed channel.

As shown in FIG. 6, device 610 include medium access control (MAC) module 602, baseband processing module 604, RF processing module 606, analog processing module 608, and a plurality of antennas including antennas 610 and 612. The example embodiment of FIG. 6 illustrates a device with first and second radio resources. However, other embodiments may include additional radio resources, as described above.

MAC module 602 includes a host interface controller 614 for connection to a host (not shown). In certain embodiments, host interface controller 614 may be re-configurable to provide multiple endpoints associated with the same or different interface types. Host interface controller 614 is connected to frame store 616, which stores data frames associated with application data streams. In the first spatial multiplexing (MIMO) configuration with a single connection, first and second streams 601 and 603 are synchronized streams and frame store 616 is connected to first frame filter and B-ACK logic unit 618, and second frame filter and B-ACK logic unit 620 is idle (indicated in dashed-line in FIG. 6). In the second configuration with two SISO connections, first and second streams 601 and 603 are independent and unsynchronized, and frame store 616 is connected both to first frame filter and B-ACK logic unit 618 for processing information associated with first stream 601 and to the second frame filter and B-ACK logic unit 620 for processing information associated with second stream 603. Frame store is further connected to encryption unit 622, for example, one in compliance with the Advanced Encryption Standard (AES), for providing data privacy. Encryption unit 622 stores encryption keys in key store 624. A frame check sequence (FCS) unit 626 is connected to encryption unit for providing checksum operation. First and second MAC blocks 628 and 630 are also provided for communication with baseband processing module 604, each including respective Enhanced Distributed Channel Access (EDCA) units for classifying traffic flows, network allocation vector (NAV) units for collision avoidance, timing synchronization function (TSF) for keeping network timers, and inter-frame space (IFS) units for providing frame spacing. In the first spatial multiplexing (MIMO) configuration, first and second streams 601 and 603 are synchronized streams, and first MAC block 628 processes information associated with both first and second streams 601 and 603, and MAC block 630 is idle (indicated in dashed-line in FIG. 6). In the second (SISO) configuration, MAC block 628 processes information associated with first stream 601 independently from information associated with stream 603 which is processing by MAC block 630. If the two SISO connections in the second configuration are on the same PHY Channel, then the $2^{nd}$ set of EDCA, NAV, and IFS functional units in MAC block 630 are not needed and may be idled (or not included at all, if the device embodiment 610 is constrained to a shared PHY Channel in the second configuration). The key store unit 624 is used to store separate keys for streams 601 and 603 in the second (SISO) configuration. The AES engine in unit 622 is used to encrypt and decrypt the independent data streams 601 and 603 in the second (SISO) configuration; this may be accomplished by sequencing the AES operations for the two streams, or by parallel engines. Likewise the FCS unit 626 is used to perform checksum operations on the independent data streams 601 and 603 in the second (SISO) configuration; this may be accomplished by sequencing the FCS operations for the two streams, or by parallel engines. Whereas in the first (MIMO) configuration, the Encryption unit 622 and FCS unit 626 service the combined data stream for the single MIMO connection.

Scrambler/De-scrambler unit 632 is connected to FCS unit 626 and to Encoder/Decoder unit 634. In the first (MIMO) configuration, unit 632 is used to scramble/descramble the combined data stream for the single MIMO connection. In the second configuration (two SISO connections), unit 632 is used to scramble/descramble the independent data streams 601 and 603; this may be accomplished by sequencing the operations for the two streams, or by parallel engines. This dual configuration principle applies to the Encoder/Decoder unit 634 as well. In the first (MIMO) configuration, Unit 634 generates and consumes encoded data streams for the two synchronized spatial streams for the single MIMO connection; in the second configuration, Unit 634 generates and consumes encoded data for asynchronous data streams for the two independent SISO connections. In addition to encoding and decoding of signals, Encoder/Decoder unit 634 may also provide forward error correction (FEC). Stream mapping unit 636 is connected between Encoder/Decoder unit 634 and interleavers/de-interleaver units 638 and 640 in the first spatial multiplexing (MIMO) configuration. Unit 636 is idle (bypassed via the dashed-lines in FIG. 6) in the second configuration with two SISO connections. QAM mapper unit 642 is connected to interleaver/de-interleaver units 638, and QAM mapper unit 644 is connected to interleaver/de-interleaver units 640. Spatial mapping unit 646 is connected between QAM mapper units 642 and 644 and respective IFFT/FFT units 648 and 650 in the first spatial multiplexing (MIMO) configuration; and is idle (bypassed via the dashed lines in FIG. 6) in the second SISO configuration. IFFT/FFT unit 648 is connected to DAC/ADC unit 656 and IFFT/FFT unit 650 is connected to DAC/ADC unit 658. The pairs of units (638, 640), (642,644), (648, 650), (656, 658) perform their respective operations on the synchronized pair of spatial streams in the first (MIMO) configuration; and in the second (SISO) configuration, they perform their respective operations on two asynchronous symbol streams for the two independent SISO connections. First and second baseband processing blocks 652 and 654 are also provided in baseband processing module 604, each including packet detection function, Clear Channel Assessment function and automatic gain control (AGC) function. In the first spatial multiplexing (MIMO) configuration, first and second streams 601 and 603 are synchronized streams, and first baseband processing block 652 processes information associated with both first and second streams 601 and 603, and baseband processing block 654 is idle (indicated in dashed-line in FIG. 6). In the second (SISO) configuration, baseband processing block 652 processes information associated with first stream 601 independently from information associated with stream 603 which is processing by baseband processing block 654. Embodiments that choose to apply AGC separately to the two spatial streams in the MIMO configuration may also use the AGC unit in block 654 for that purpose. In the second configuration, if the two SISO connections happen to be on the same PHY Channel, then the Packet Detection and CCA units in block 654 are not needed and may be idled (or not included at all, if the device embodiment 610 is constrained to a shared PHY Channel in the second configuration).

Transmit/Receive (TX/RX) unit 660 of RF processing module 606 is connected to DAC/ADC unit 656 and to first local oscillator (LO) 662, and TX/RX unit 664 is connected to DAC/ADC unit 658. During spatial multiplexing (MIMO) operation in the first configuration, TX/RX unit 664 is also connected to first LO 662 and second LO 668 is bypassed (e.g., idle and indicated in dashed line in FIG. 6). However, during SISO operation in the second configuration, TX/RX unit 664 is connected to second LO 668 instead of first LO 662 for independently processing information associated with stream 603. In the second configuration, if the two SISO connections happen to be on the same PHY Channel, then the second LO unit 668 is not needed and may be idled (or not included at all, if the device embodiment 610 is constrained to a shared PHY Channel in the second configuration).

Power amplifier (PA)/low noise amplifier (LNA) unit 670 of analog processing unit 608 is connected to TX/RX unit 660 and to filter/switch unit 672 for communication via antenna 611. Likewise, PA/LNA unit 674 is connected to TX/RX unit 664 and to filter/switch unit 676 for communication via antenna 612. In the second configuration (with 2 independent SISO connections), the pairs of analog units and TX/RX chains may be operating on two different PITY channels, potentially in different frequency bands.

In certain embodiments of the second configuration, the links for the SISO connections may be established over the same physical channel or different physical channels. By way of example, the two SISO connections in the second configuration may be on different PHY Channels in the 2.4 GHz band (e.g. 802.11g connection to an AP on Channel 1, and High-Speed Bluetooth 802.11g connection on Channel 6). As another illustration, a first SISO connection may be an 802.11g connection to an AP on a channel in the 2.4 GHz band, and a second SISO connection may be a high speed Bluetooth 802.11a connection in the 5 GHz band.

A controller may be implemented to control the configuration and re-configuration of device 610 for supporting and switching between the single client station MIMO operation configuration and the separate independent client station SISO configurations. In either configuration, device 610 may be operating as a client STA or as an AP or both. While the above description has been provided to illustrate an exemplary embodiment, the specific ordering of processing blocks, i.e., radio resources, may be modified from that described above and shown in FIG. 6 in accordance with design considerations. In FIG. 6, the majority of functional units typically present in a device capable of supporting the first (MIMO) configuration are modified to be dynamically configurable and to support the second configuration. The incremental functional units added to support the second configuration are relatively few. This allows the second configuration to be supported without necessarily duplicating the full cost to support the first configuration. Furthermore, in other embodiments, fewer and/or additional radio resources may be provided to support a particular communication system type.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other electronic storage, optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or other wireless technologies such as infrared, radio, and microwave are included in the definition of medium. Disk and disc, as used herein, includes compact disc (CD), laser disc, optical disc, digital versatile disc (DVD), floppy disk, high definition DVD (HD-DVD) and blue-ray disc, where disks usually reproduce data magnetically, while discs reproduce data optically with lasers. Combination of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for configuring a plurality of radio resources in a wireless communication device including a first radio resource and second radio resource, the method comprising:
configuring, at the wireless communication device, the first and second radio resources for spatial multiplexing according to a first communication system type, wherein the first communication system type comprises a first wireless network suitable for MIMO operation;
receiving, at the wireless communication device, a request for communication over a second communication system type, wherein the second communication system type comprises a second wireless network suitable for SISO operation, and wherein the second wireless network is different than the first wireless network; and
re-configuring, at the wireless communication device, the second radio resource from the configuration according to the first communication system type to a configuration for communication over the second communication system type while maintaining the first radio resource for communication over the first communication system type.

2. The method of claim 1, further comprising:
maintaining a first communication link over the first communication system while establishing a second communication link over the second communication system.

3. The method of claim 1, further comprising re-configuring, at the wireless communication device, the first radio resource for non-spatial multiplexing according to the first communication system type.

4. The method of claim 1, further comprising re-configuring, at the wireless communication device, a third radio resource and the first radio resource for spatial multiplexing according to the first communication system type.

5. The method of claim 1, further comprising:
terminating a communication link over the second communication system type;
re-configuring, at the wireless communication device, the first and second radio resources for spatial multiplexing according to the first communication system type.

6. The method of claim 1, further comprising:
detecting a termination of a communication link over the second communication system type;
re-configuring, at the wireless communication device, the first and second radio resources for spatial multiplexing according to the first communication system type.

7. The method of claim 1, wherein the first communication system type is a wireless local area network, and the second communication system type is a wireless personal area network.

8. The method of claim 1, wherein the first communication system type is a wireless wide area network, and the second communication system type is a wireless personal area network.

9. The method of claim 1, wherein the first communication system type includes a first access point controlling access to the first communication system, and wherein the second communication system type is an ad-hoc network.

10. The method of claim 1, wherein the first communication system type and the second communication system type utilize the same physical channel.

11. The method of claim 1, wherein the first communication system type and the second communication system type utilize different physical channels.

12. The method of claim 1, wherein the radio resources is at least one of: Antenna, PA, LNA, filter, switch, RF chain, ADC, DAC, FFT/IFFT, QAM mapper, Interleaver/Deinterleaver, Encoder/Decoder, Scrambler/Descrambler, FCS engine, Encryption engine and key store, Packet memory storage, and Host interface.

13. A wireless communication device comprising:
a controller;
a plurality of radio resources including a first radio resource and second radio resource, each of the first and second radio resources connected to the controller, the controller configured to:
configure the first and second radio resources for spatial multiplexing according to a first communication system type, wherein the first communication system type comprises a first wireless network suitable for MIMO operation;
receive a request for communication over a second communication system type, wherein the second communication system type comprises a second wireless network suitable for SISO operation, and wherein the second wireless network is different than the first wireless network; and
re-configure the second radio resource from the configuration according to the first communication system type to a configuration for communication over the second communication system type while maintaining the first radio resource for communication over the first communication system type.

14. The device of claim 13, wherein the controller is further configured to:
maintain a first communication link over the first communication system while establishing a second communication link over the second communication system.

15. The device of claim 13, wherein the controller is further configured to re-configure the first radio resource for non-spatial multiplexing according to the first communication system type.

16. The device of claim 13, wherein the controller is further configured to re-configure a third radio resource and the first radio resource for spatial multiplexing according to the first communication system type.

17. The device of claim 13, wherein the controller is further configured to
terminate a communication link over the second communication system type;
re-configure the first and second radio resources for spatial multiplexing according to the first communication system type.

18. The device of claim 13, wherein the controller is further configured to:
detect a termination of a communication link over the second communication system type;
re-configure the first and second radio resources for spatial multiplexing according to the first communication system type.

19. The device of claim 13, wherein the first communication system type is a wireless local area network, and the second communication system type is a wireless personal area network.

20. The device of claim 13, wherein the first communication system type is a wireless wide area network, and the second communication system type is a wireless personal area network.

21. The device of claim 13, wherein the first communication system type includes a first access point controlling access to the first communication system, and wherein the second communication system type is an ad-hoc network.

22. The device of claim 13, wherein the first communication system type and the second communication system type utilize the same physical channel.

23. The device of claim 13, wherein the first communication system type and the second communication system type utilize different physical channels.

24. The device of claim 13, wherein the radio resources is at least one of:
Antenna, PA, LNA, filter, switch, RF chain, ADC, DAC, FFT/IFFT, QAM mapper, Interleaver/Deinterleaver, Encoder/Decoder, Scrambler/Descrambler, FCS engine, Encryption engine and key store, Packet memory storage, and Host interface.

25. A computer program product for configuring a plurality of radio resources in a wireless communication device including a first radio resource and second radio resource, comprising:
- a non-transitory computer-readable medium storing:
  - code for causing a computer to configure the first and second radio resources for spatial multiplexing according to a first communication system type, wherein the first communication system type comprises a first wireless network suitable for MIMO operation;
  - code for causing the computer to receive a request for communication over a second communication system type, wherein the second communication system type comprises a second wireless network suitable for SISO operation, and wherein the second wireless network is different than the first wireless network; and
  - code for causing the computer to re-configure the second radio resource from the configuration according to the first communication system type to a configuration for communication over the second communication system type while maintaining the first radio resource for communication over the first communication system type.

26. The computer program product of claim 25, wherein the computer-readable medium further stores:
- code for causing the computer to maintain a first communication link over the first communication system while establishing a second communication link over the second communication system.

27. The computer program product of claim 25, wherein the computer-readable medium further stores:
- code for causing the computer to re-configure the first radio resource for non-spatial multiplexing according to the first communication system type.

28. The computer program product of claim 25, wherein the computer-readable medium further stores:
- code for causing the computer to re-configure a third radio resource and the first radio resource for spatial multiplexing according to the first communication system type.

29. The computer program product of claim 25, wherein the computer-readable medium further stores:
- code for causing the computer to terminate a communication link over the second communication system type; and
- code for causing the computer to re-configure the first and second radio resources for spatial multiplexing according to the first communication system type.

30. The computer program product of claim 25, wherein the computer-readable medium further stores:
- code for causing the computer to detect a termination of a communication link over the second communication system type;
- code for causing the computer to re-configure the first and second radio resources for spatial multiplexing according to the first communication system type.

31. A wireless communication device comprising:
- a controller;
- a plurality of radio resources including a first radio resource and second radio resource, each of the first and second radio resources connected to the controller;
- means for configuring the first and second radio resources for spatial multiplexing according to a first communication system type, wherein the first communication system type comprises a first wireless network suitable for MIMO operation;
- means for receiving a request for communication over a second communication system type, wherein the second communication system type comprises a second wireless network suitable for SISO operation, and wherein the second wireless network is different than the first wireless network; and
- means for re-configuring the second radio resource from the configuration according to the first communication system type to a configuration for communication over the second communication system type while maintaining the first radio resource for communication over the first communication system type.

32. The wireless communication device of claim 31, further comprising:
- means for maintaining a first communication link over the first communication system while establishing a second communication link over the second communication system.

33. The wireless communication device of claim 31, further comprising means for re-configuring the first radio resource for non-spatial multiplexing according to the first communication system type.

34. The wireless communication device of claim 31, further comprising means for re-configuring a third radio resource the first radio resource for spatial multiplexing according to the first communication system type.

35. The wireless communication device of claim 31, further comprising:
- means for terminating a communication link over the second communication system type;
- means for re-configuring the first and second radio resources for spatial multiplexing according to the first communication system type.

36. The wireless communication device of claim 31, further comprising:
- means for detecting a termination of a communication link over the second communication system type;
- means for re-configuring the first and second radio resources for spatial multiplexing according to the first communication system type.

* * * * *